(12) United States Patent
Zhu et al.

(10) Patent No.: US 7,181,498 B2
(45) Date of Patent: Feb. 20, 2007

(54) COMMUNITY-BASED GREEN LIST FOR ANTISPAM

(75) Inventors: Jing Zhu, Fremont, CA (US); George Hu, San Jose, CA (US)

(73) Assignee: Yahoo! Inc., Sunnyvale, CA (US)

( * ) Notice: Subject to any disclaimer, the term of this patent is extended or adjusted under 35 U.S.C. 154(b) by 73 days.

(21) Appl. No.: 10/790,332

(22) Filed: Mar. 1, 2004

(65) Prior Publication Data

US 2005/0097170 A1    May 5, 2005

Related U.S. Application Data

(60) Provisional application No. 60/516,003, filed on Oct. 31, 2003.

(51) Int. Cl.
G06F 15/16  (2006.01)
G06F 15/173 (2006.01)

(52) U.S. Cl. ............... 709/206; 709/207; 709/238; 709/242; 709/249

(58) Field of Classification Search ........ 709/202–206, 709/207, 217, 218, 219, 238, 242, 249; 713/176
See application file for complete search history.

(56) References Cited

U.S. PATENT DOCUMENTS

| 6,023,723 | A  | * | 2/2000  | McCormick et al. | ....... 709/206 |
| 6,269,369 | B1 | * | 7/2001  | Robertson        | ........... 709/202 |
| 6,654,787 | B1 | * | 11/2003 | Aronson et al.   | ............ 709/206 |
| 6,691,156 | B1 | * | 2/2004  | Drummond et al.  | ........ 709/206 |
| 2003/0167311 | A1 | * | 9/2003 | Kirsch | .................... 709/206 |
| 2004/0177110 | A1 | * | 9/2004 | Rounthwaite et al. | ...... 709/202 |
| 2004/0255122 | A1 | * | 12/2004 | Ingerman et al. | ........... 713/176 |

OTHER PUBLICATIONS

Jordan et al., "The Augmented Social Network: Building identity and trust into the next-generation internet", first monday Peer-Reviewed Journal on the Internet, www.firstmonday.dk/issues/issue8_8/jordan/, pp. 1-64.

* cited by examiner

Primary Examiner—Rupal Dharia
Assistant Examiner—Quang N. Nguyen
(74) Attorney, Agent, or Firm—Darby & Darby PC; John W. Branch (57) ABSTRACT

A community-based "green list" (CGL) message filter for mail service providers. The CGL filtering enables trusted messages to be delivered directly into a user's inbox folder and other messages to be delivered to other folders associated with the user. The CGL filtering indicates which messages are sent from those message addresses listed as friends in the user's personal address book. Also, the scope of CGL filtering includes more than those message addresses that the user interacts with directly (one degree of separation). For example, the CGL filtering also evaluates message addresses that are connected more remotely to the user through other nodes (users) in the online community that are located multiple degrees of separation away from the user.

18 Claims, 5 Drawing Sheets

COMMUNITY-BASED GREEN LIST FOR ANTISPAM

CROSS REFERENCE TO RELATED APPLICATIONS

This application claims the benefit of U.S. Provisional Application Ser. No. 60/516,003 filed on Oct. 31, 2003, the benefit of the earlier filing date of which is hereby claimed under 35 U.S.C. § 119 (e) and further incorporated by reference.

FIELD OF THE INVENTION

The present invention related generally to messaging systems, and more particularly to reducing unsolicited messages from unknown senders.

BACKGROUND OF THE INVENTION

Mail spam (unsolicited messages) has become a wide spread industrial problem for mail service providers. It not only greatly inconveniences the user but also wastes a mail service provider's resources to maintain and store large amounts of spam message data. In today's world, how well a mail service provider detects and filters spam messages has become a key attribute to the quality of service and ultimately to the economic success of the mail service provider.

As spam filters become more and more aggressive to combat the growing spam problem, the issue of false positives quickly becomes a problem. False positives may be defined as personal and non-spam email that is mistakenly classified as spam by the spam filter. Because of the potential for false positives, a User is often forced to regularly looking into a bulk folder, or the like, to make sure that they don't have any wanted emails misclassified as spam. This may become a time and resource drain for the email users.

Aside from email address forgery, it's an accepted common sense notion that any email sent from a contact in a user's personal address book is wanted by the user and should be given a "green light" to be deposited into a user's inbox folder. In some cases, a spammer could still forge an email address from the personal address book and send unsolicited emails to the user.

Additionally, for many email users, their address books are either empty or not large enough to become useful in the identification of most of the wanted emails. Therefore, there is a need in the industry to enable a more effective approach to managing email delivered to a user's inbox. Thus, it is with respect to these considerations and others that the present invention has been made.

BRIEF DESCRIPTION OF THE DRAWINGS

Non-limiting and non-exhaustive embodiments of the present invention are described with reference to the following drawings. In the drawings, like reference numerals refer to like parts throughout the various figures unless otherwise specified. For a better understanding of the present invention, reference will be made to the following Detailed Description of the Invention, which is to be read in association with the accompanying drawings, wherein.

DETAILED DESCRIPTION OF THE INVENTION

The present invention now will be described more fully hereinafter with reference to the accompanying drawings, which form a part hereof, and which show, by way of illustration, specific exemplary embodiments by which the invention may be practiced. This invention may, however, be embodied in many different forms and should not be construed as limited to the embodiments set forth herein; rather, these embodiments are provided so that this disclosure will be thorough and complete, and will fully convey the scope of the invention to those skilled in the art. Among other things, the present invention may be embodied as methods or devices. Accordingly, the present invention may take the form of an entirely hardware embodiment, an entirely software embodiment or an embodiment combining software and hardware aspects. The following detailed description is, therefore, not to be taken in a limiting sense.

The terms "comprising," "including," "containing," "having," and "characterized by," refers to an open-ended or inclusive transitional construct and does not exclude additional, unrecited elements, or method steps. For example, a combination that comprises A and B elements, also reads on a combination of A, B, and C elements.

The meaning of "a," "an," and "the" include plural references. The meaning of "in" includes "in" and "on." Additionally, a reference to the singular includes a reference to the plural unless otherwise stated or is inconsistent with the disclosure herein.

The term "or" is an inclusive "or" operator, and includes the term "and/or," unless the context clearly dictates otherwise.

The phrase "in one embodiment," as used herein does not necessarily refer to the same embodiment, although it may.

The term "based on" is not exclusive and provides for being based on additional factors not described, unless the context clearly dictates otherwise.

The term "flow" includes a flow of packets through a network. The term "connection" refers to a flow or flows of messages that typically share a common source and destination.

Briefly stated, the present invention is directed to a method and system for enabling a community-based "green list" (CGL) message filter for mail service providers. The CGL filtering enables trusted messages to be delivered directly into a user's inbox folder so that other messages can be filtered more aggressively in combination to other spam filtering methods. The CGL filtering indicates which messages are sent from those message addresses listed as friends in the user's personal address book. Also, the scope of CGL filtering includes more than those message addresses that the user interacts with directly (one degree of separation). For example, the CGL filtering also evaluates message addresses that are connected more remotely to the user through other nodes (users) in the online community that are located multiple degrees of separation away from the user.

In different embodiments, the CGL filter can be based on different types of message addresses (singly or in combination) including, but not limited to, email addresses and telephone numbers. Also, in other embodiments, the CGL filtering is employed with different types of messages, either singly or in combination, including email, Short Message Service (SMS), Multi-Media Messaging Service (MMS), Instant Message (IM), and the like.

In some embodiments, a node can be identified as a super node or determined to be one because the node has entries linked to relatively large numbers of other message addresses. The CGL filtering can employ various message filtering approaches based on a super node relationship to a user. For example, CGL filtering may be configured to allow messages from a super node to be delivered to the user's inbox, but not messages that are at least two degrees of separation away from the user, where a super node is the only first degree node separating the user and the sender. Consider the example where super node X is one degree of separation from the user, and nodes Y and Z are each two degrees of separation from the user. Node Y may be separated from the user by some other node W. However, node Z is separated from the user only through super node X. Then, CGL filtering may be configured to enable delivery of messages from super node X, nodes W and Y, but not node Z. Thus, CGL filtering based on a relationship with a super node may be used to exclude a message from the user's inbox or treat the message with less trust than another message from another node's relationship, even though they may be both the same degree of separation away from the user.

An example of a super node might be an email address that provides information for a popular online company, such as help@yahoo.com. Another example of a super node might be a popular mailing list subscribed by thousands and/or tens of thousands people.

Illustrative Operating Environment

Figure 1:
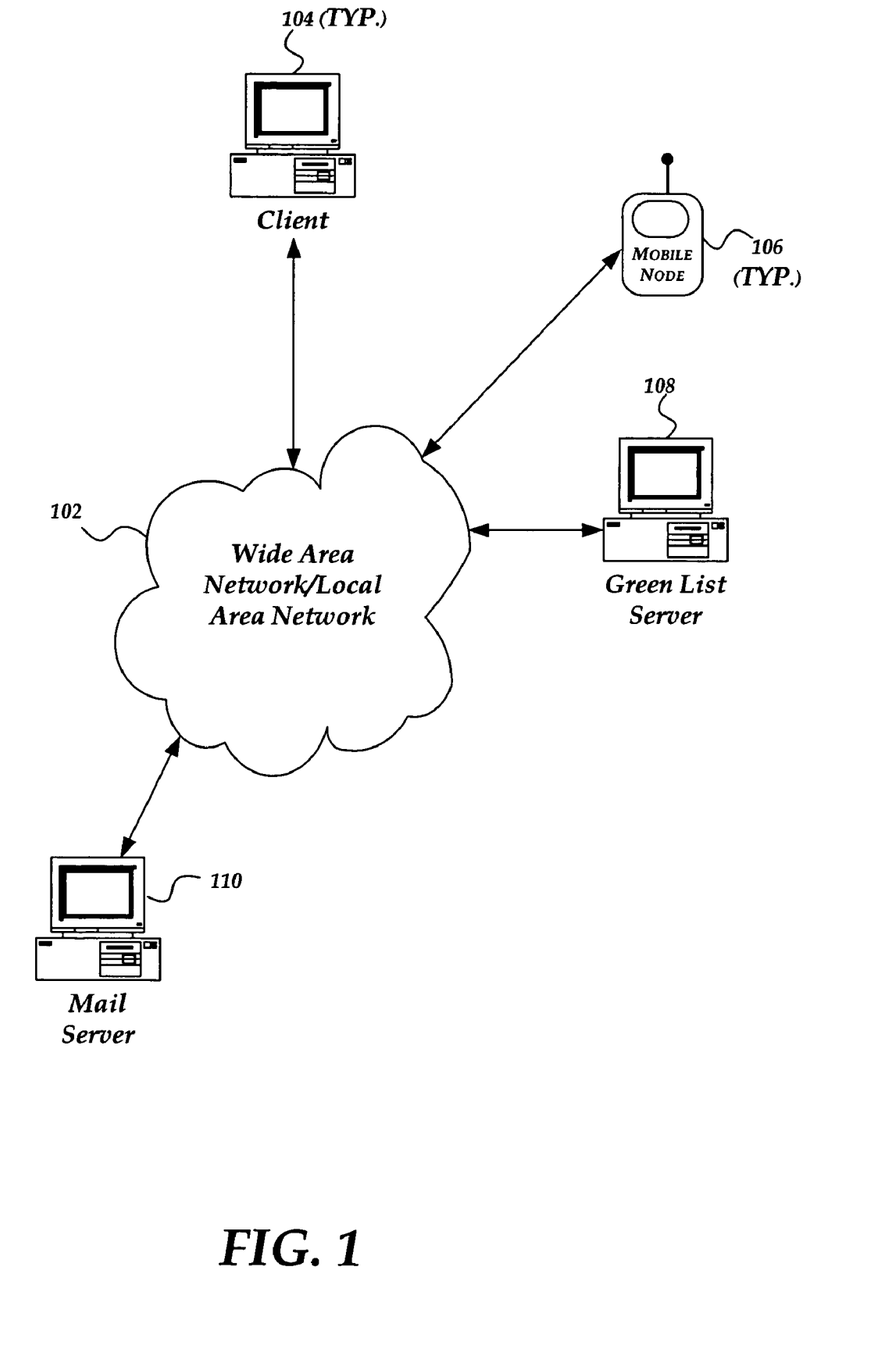
FIG. 1 illustrates a block diagram of an exemplary system for implementing the invention.

FIG. 1 shows components of an exemplary environment in which the invention may be practiced. Not all the components may be required to practice the invention, and variations in the arrangement and type of the components may be made without departing from the spirit or scope of the invention.

In FIG. 1, one or more local area networks ("LANs") and/or wide area networks ("WAN") are included in a network 102, such as the Internet, that enables communication between various users, devices, servers, clients, processes, and the like. As shown, client 104, mobile node 106, mail server 110 and green list server 108, are shown employing network 102 to communicate with each other, and the like. Mobile node 106 can couple to network 102 using a wireless communications medium. The mobile node can include a mobile telephone, smart phone, pager, walkie talkie, radio frequency (RF) device, infrared (IR) device, WI-FI device, and integrated devices combining one or more of the preceding devices, and the like.

Although not shown, the LANs and WANs of network 102 are typically interconnected by routers and/or switches. Also, communication links within the LANs and WANS can include twisted pair, fiber optics, or coaxial cable, while communication links between networks may utilize analog telephone lines, full or fractional dedicated digital lines including T1, T2, T3, and T4, Integrated Services Digital Networks (ISDNs), Digital Subscriber Lines (DSLs), wireless links, and the like. Furthermore, the number of WANs, and LANs in FIG. 1 may be increased or decreased arbitrarily without departing from the spirit or scope of this invention.

The media used to transmit information in communication links as described above illustrates one type of computer-readable media, namely communication media. Generally, computer-readable media includes any media that can be accessed by a computing device. Computer-readable media may include computer storage media, communication media, or any combination thereof.

Additionally, communication media typically embodies computer-readable instructions, data structures, program modules, or other data in a modulated data signal such as a carrier wave or other transport mechanism and includes any information delivery media. The terms "modulated data signal," and "carrier-wave signal" includes a signal that has one or more of its characteristics set or changed in such a manner as to encode information, instructions, data, and the like, in the signal. By way of example, communication media includes wired media such as twisted pair, coaxial cable, fiber optics, wave guides, and other wired media and wireless media such as acoustic, RF, infrared, and other wireless media.

Mail server 110 and green list server 108 includes, among other components, a central processing unit (processor), a memory for storing instructions, and a network interface unit connected via a bus. The network interface unit includes the necessary circuitry for connecting mail server 110 and green list server 108 to network 102, and is constructed for use with various communication protocols including the TCP/IP and UDP/IP protocols. The network interface unit may include or interface with circuitry and components for communicating information, such as graphical displays, advertiser data, and the like over a wired and/or wireless communications medium. Network interface unit is sometimes referred to as a transceiver.

Illustrative Server Environment

Figure 2:
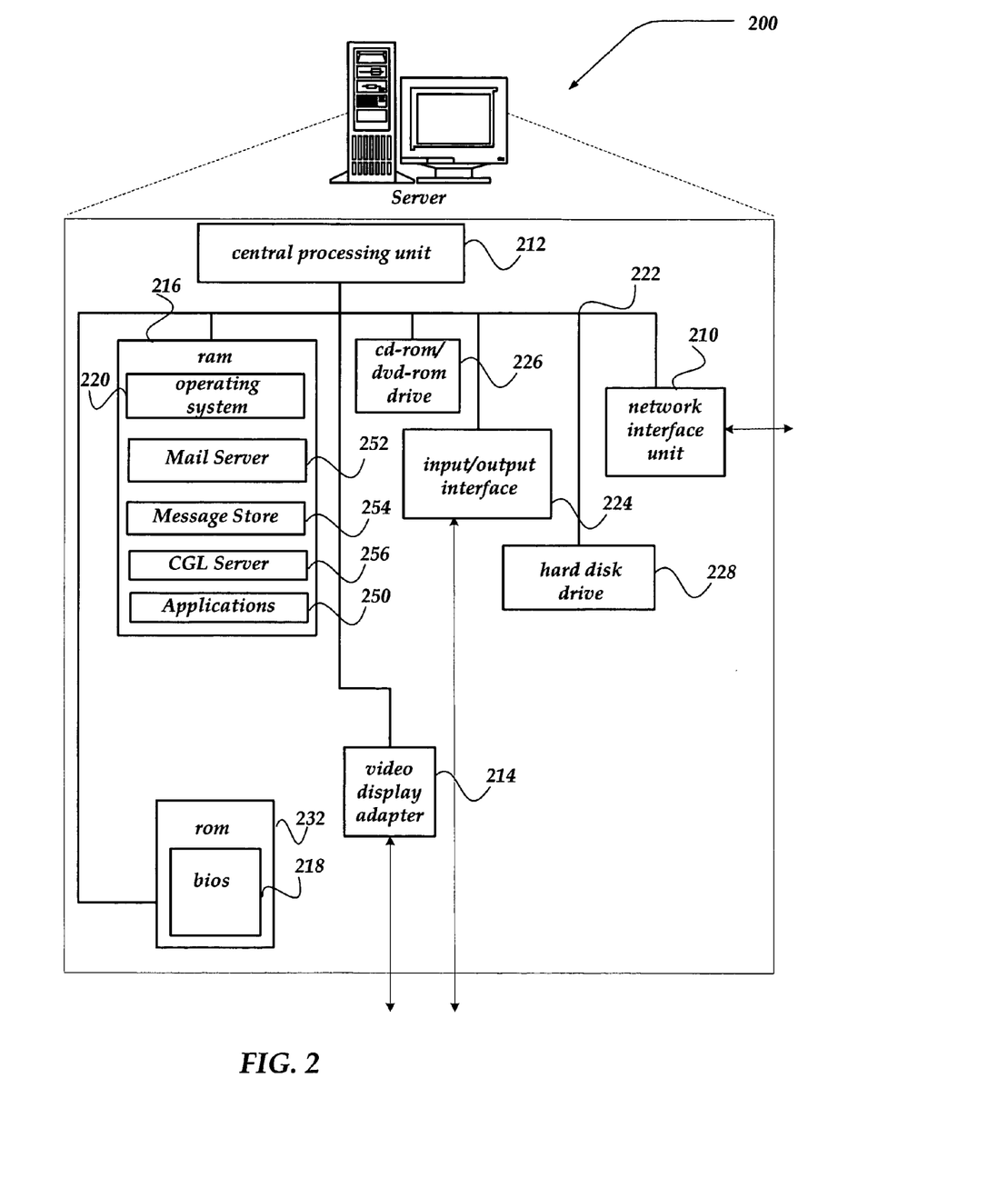
FIG. 2 shows a schematic diagram of an exemplary server.

FIG. 2 shows one embodiment of a server, according to one embodiment of the invention. Computer server 200 may include many more components than those shown. The components shown, however, are sufficient to disclose an illustrative embodiment for practicing the invention.

Computer server 200 includes processing unit 212, video display adapter 214, and a mass memory, all in communication with each other via bus 222. The mass memory generally includes RAM 216, ROM 232, and one or more permanent mass storage devices, such as hard disk drive 228, tape drive, optical drive, and/or floppy disk drive. The mass memory stores operating system 220 for controlling the operation of server 102. Any general-purpose operating system may be employed. Basic input/output system ("BIOS") 218 is also provided for controlling the low-level operation of server 102. As illustrated in FIG. 2, server 200 also can communicate with the Internet, or some other communications network, such as network 105 in FIG. 1, via network interface unit 210, which is constructed for use with various communication protocols including the TCP/IP protocol. Network interface unit 210 is sometimes known as a transceiver or transceiving device.

The mass memory as described above illustrates another type of computer-readable media, namely computer storage media. Computer storage media may include volatile, non-volatile, removable, and non-removable media implemented in any method or technology for storage of information, such as computer readable instructions, data structures, program modules, or other data. Examples of computer storage media include RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by a computing device.

The mass memory also stores program code and data. One or more applications 250 are loaded into mass memory and run on operating system 220. Examples of application programs include mail programs, schedulers, calendars, database programs, word processing programs, HTTP programs, HDML programs, SMS programs, spreadsheet programs, and so forth. Mass storage may further include applications such as mail server 252, message store 254, and community-based green list (CGL) server 256.

Although illustrated in FIG. 2 as distinct components in computer server 200, mail server 252, message store 254, and CGL server 256 may be arranged, combined, and the like, in any of a variety of ways, without departing from the scope of the present invention. Moreover, mail server 252, message store 254, and CGL 256 may reside in one or more separate computing devices, substantially similar to computer server 200.

Computer server 200 may also include an SMTP handler application for transmitting and receiving e-mail, an HTTP handler application for receiving and handing HTTP requests, and an HTTPS handler application for handling secure connections. The HTTPS handler application may initiate communication with an external application in a secure fashion.

Computer server 200 also includes input/output interface 224 for communicating with external devices, such as a mouse, keyboard, scanner, or other input devices not shown in FIG. 2. Likewise, server 200 may further include additional mass storage facilities such as CD-ROM/DVD-ROM drive 226 and hard disk drive 228. Hard disk drive 228 may be utilized to store, among other things, application programs, databases, registration information, messages, and the like.

Community Based Green List

Figure 3:
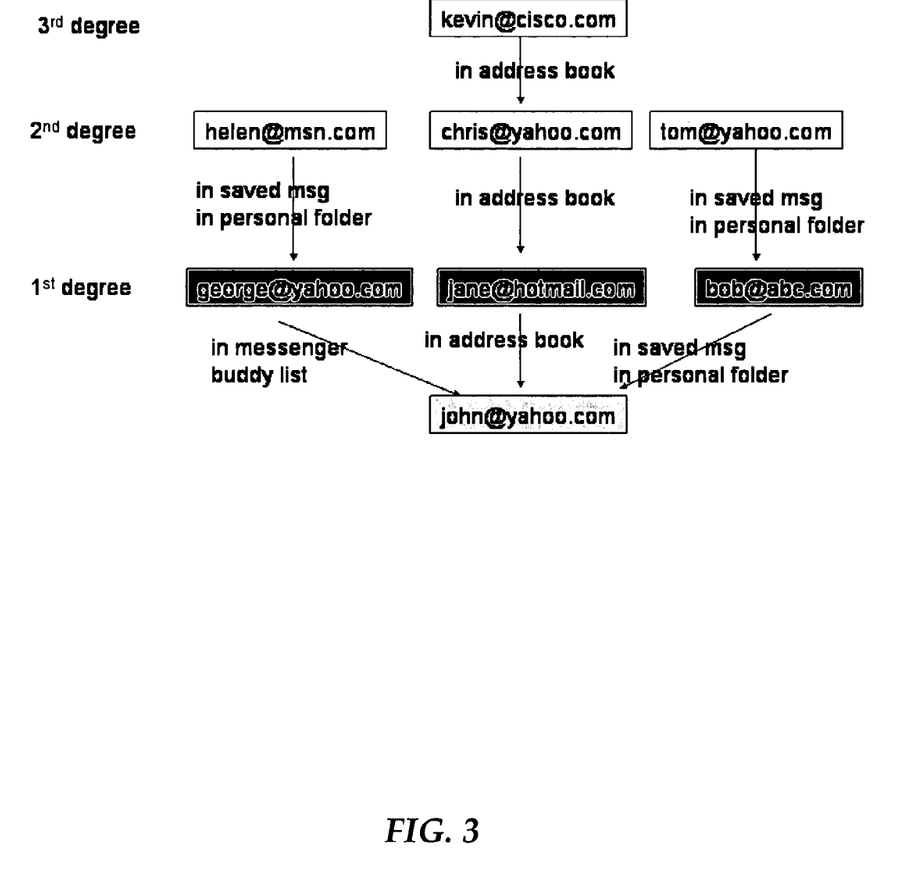
FIG. 3 illustrates a graphical representation of degrees of separation.

Mirroring the interaction of individuals in the real world, email addresses can form a community based on various online activities such as adding into the personal address book, saving emails to the personal folders, sending or replying to emails, and the like. In FIG. 3, an email community network based on a typical email address "john@yahoo.com" is sketched. All of the email addresses shown in this figure are for illustration purposes only. Also, although not shown in FIG. 3, substantially the same degrees of separation can be arranged in other embodiments for SMS, MMS, and IM addresses/messages.

FIG. 3 shows email user john@yahoo.com having several friends that he is directly connected to, such as jane@hotmail.com in the address book, george@yahoo.com in the messenger buddy list, and bob@abc.com in the saved email messages stored in the personal mail folder. These addresses are separated by one degree from john@yahoo.com. Extending this connectivity concept a bit further, first degree address george@yahoo.com is connected to Helen@msn.com, jane@hotmail.com is connected to chris@yahoo.com, and bob@abc.com is connected to tom@yahoo.com. These three email addresses Helen@msn.com, chris@yahoo.com and tom@yahoo.com are not connected to john@yahoo.com directly, but they are connected to john@yahoo.com via the first degree addresses, which are termed email addresses with two degrees of separation from john@yahoo.com. In this way, the email network around john@yahoo.com can be constructed from email addresses up to as many degrees of separation that are to be trusted.

In the common green list implementation, email address jane@hotmail.com is in john's green list and emails sent by jane@hotmail.com will be filtered directly into john's inbox folder. However this filtering mechanism based on the personal address book can have limited capability since other email addresses in the network shown above are not participating in the filtering.

An enhanced green list can be constructed from the email addresses connected to the email address of interest with multiple degrees of separation. This enhanced green list not only can include the email addresses with first degree of separation such as those found in a messenger buddy list, personal address book and saved messages in a personal folder; but also can include the email addresses in the network with two or more degrees of separation. For example, in the example shown above, first degree email addresses like george@yahoo.com, jane@hotmail.com, bob@abc.com, second degree email addresses like Helen@msn.com, chris@yahoo.com, tom@yahoo.com, and third degree email addresses like Kevin@cisco.com all become part of the enhanced green list. Since this enhanced green list takes the community connectivity of the email address into account, it represents a "community-based green list (CGL)".

However, as the degrees of separation get bigger, the association strength of email addresses to the email address of interest becomes weaker. The existence of these email addresses with big degrees of separation in the CGL can be expected to become less useful in the filtering of emails. Thus, for some purposes a cut-off limit can be set for the maximum number of degrees of separation from a user. In this way, email addresses beyond this cut-off limit probably could not be included in the community-based green list without contributing to a degradation in the effectiveness of CGL filtering.

The CGL filtering is typically employed as an anti-spam method, not a "friends" list. Thus, although many friends' email addresses would be included in this community, not all email addresses in the CGL would be considered or trusted as friends in the more traditional sense.

Email Inclusive Filtering

Emails coming from email addresses in the CGL could bypass most other spam filters and be deposited into inbox folder directly. In one embodiment, direct blocking of particular email addresses could still override the CGI filtering. Similarly, in another embodiment, a blocked list for email addresses that is generated by the user as part of a "this is spam" click (selection) could also override the CGI filter. Typically, any emails that were not from the CGL would continue to be subject of spam filtering by other methods. However, since a relatively large percentage of non-spam emails could be protected by the CGL filter, other anti-spam filter settings for other emails could be turned on relatively high without too much concern for false positives.

Email Exclusive Filtering

In one embodiment, most emails that did not originate from the email addresses in the CGL would be filtered and deposited into another folder (not the inbox folder) such as a Bulk folder or another folder whose unread emails are deleted after a period of time. The rate of false positives for non-spam email that is not part of the CGL would be relatively less due to the high coverage of emails for the user and the overall net effect of the CGL filtering on emails from the online community.

A community-based green list (CGL) filter offers several benefits including the following: (1) significantly reduce the false positive rate caused by other spam filtering techniques; (2) automatic maintenance by a service provider so that users don't have to manage this filtering system other than to perform normal activities; and (3) the CGL filter can be more effective than a green list that is only based on a user's personal address book due in part to the coverage and network effect of the CGL. Also, in one embodiment, if anyone is added into a friends' green-list, they will also be automatically included in a user's green-list.

Establishing a First Degree Green-List

The email addresses in a first degree green list can be collected from many sources, including, but not limited to:
  (1) personal address book;
  (2) messenger buddy list;
  (3) saved email messages in personal folders;
  (4) Sent, replied, and forwarded emails;
  (5) "This is not spam" emails;
  (6) relatively small active groups that the user has participated in (optional);
  (7) Received email that wasn't classified as spam (the opposite of item 4 because the recipient will be the first degree of the sender, but not necessarily vise versa); and
  (8) Any other feeds that may establish relationship between two email addresses (such as social networking, etc.).

Not all of these sources should be treated as equal. It is likely that one or more actions may not be sufficient to establish a first degree of separation between A and B. Instead, multiple actions from the same or different sources may be required to establish the first degree for CGL purposes. For example, we may want to consider A sending email to B not sufficient as the condition for B in A's first degree of separation. Rather, A might have to send two or three emails within a certain time frame (e.g. three months) before a first degree relationship is established. Alternatively, A could send B one email AND A and B belongs to the same group or mailing list with a size of less than 100 would qualify B to be in A's first degree of separation group.

The first degree green-list can be bi-directional. For example, if B is in A's first degree green-list, A may not be in B's green-list.

The first degree link may be broken or removed through certain user actions as well. For example, a "This is spam" complaint from A to B will remove B from A's first degree green-list.

Building a Community-based Green List

The email addresses in these sources form A's first degree addresses in the CGL, then first degree contacts of these first degree addresses that are not already A's first degree shall be added as the second degree contacts for A. Similarly, the third degree of A can be composed of the first degrees of A's second degrees that are not already A's first and second degree email addresses.

Certain emails addresses may need to be treated specially to maintain the quality of the green-list. For example, some email addresses in the CGL may be connected to a large number of email addresses, such as the email list. A super node may be identified as a node that has more than a certain number of first degree links. The absolute number may be adjusted by real example scenarios. The existence of these super nodes in the CGL may degrade the effectiveness of the CGL. These super nodes could be removed in the CGL as part of multi-degree consideration.

Updating a Community-based Green List

Individual updates to these sources shall be propagated to the CGL. The update doesn't have to be real time and can be performed in a batch mode. The exception to this may be the first degree update. It is relatively straightforward to update the first degree links. Therefore, it may be worthwhile to update the first degree in real time while the >1 degrees can be updated in a batch mode.

When a new email address is registered, its personal CGL can be very small. Initially, the majority of the emails received will be from email addresses that are outside of its first degree link or even not connected. As this email address interacts more with the community, its first degree can grow quickly along with its second degrees. More and more emails will be coming from the first and second degrees. Also, after a certain period of time, the CGL may reach a semi-stable state, growing very slowly if growing at all, reflecting the fact that the community of the friends will reach a semi-stable state after some duration of social engagement. The effective cut-off radius may be infinity when the address is a new born (none or few first degree links). However, the cut-off radius should quickly decrease as the mailbox matures, making the CGL system more effective for the user.

Implementation also pays attention to the following issues:
  (1) Email aliases: user with email aliases has the same address book, buddy list and mail folders, so all email aliases shall be treated as one node.
  (2) Disposable email address: the email address network built around the disposable email address may contain spammers so this network would be separated out from the CGL built around the primary email address or aliases.
  (3) Forged email address: spammer may forge the friend's email address and send emails to the user, CGL may not be as effective without some form of email address verification mechanism. However, since it would be relatively difficult for a spammer to get into everybody's green list, the email forgery issue should not pose a relatively large issue for the deployment of CGL.

The effectiveness of the CGL depends at least in part on coverage. If A's first degree are also hosted by the same ISP as A, then A will have a "complete" second degree list as well. Similarly, if all A's second degree are also with the same ISP, then A will have a complete third degree list too. However, most likely, only a portion of A's first degree will be hosted by the same ISP, and therefore, this ISP will only have a portion of A's second degree contact. If that portion is small or even zero, then the CGL might not be as effective.

The percentage of A's first degree or second degree that should be in the same network for sufficient effectiveness is determinable by modeling and real examples. 100% would be the most effective. 1% would most likely not be enough for most applications.

Flow Charts

Figure 4:
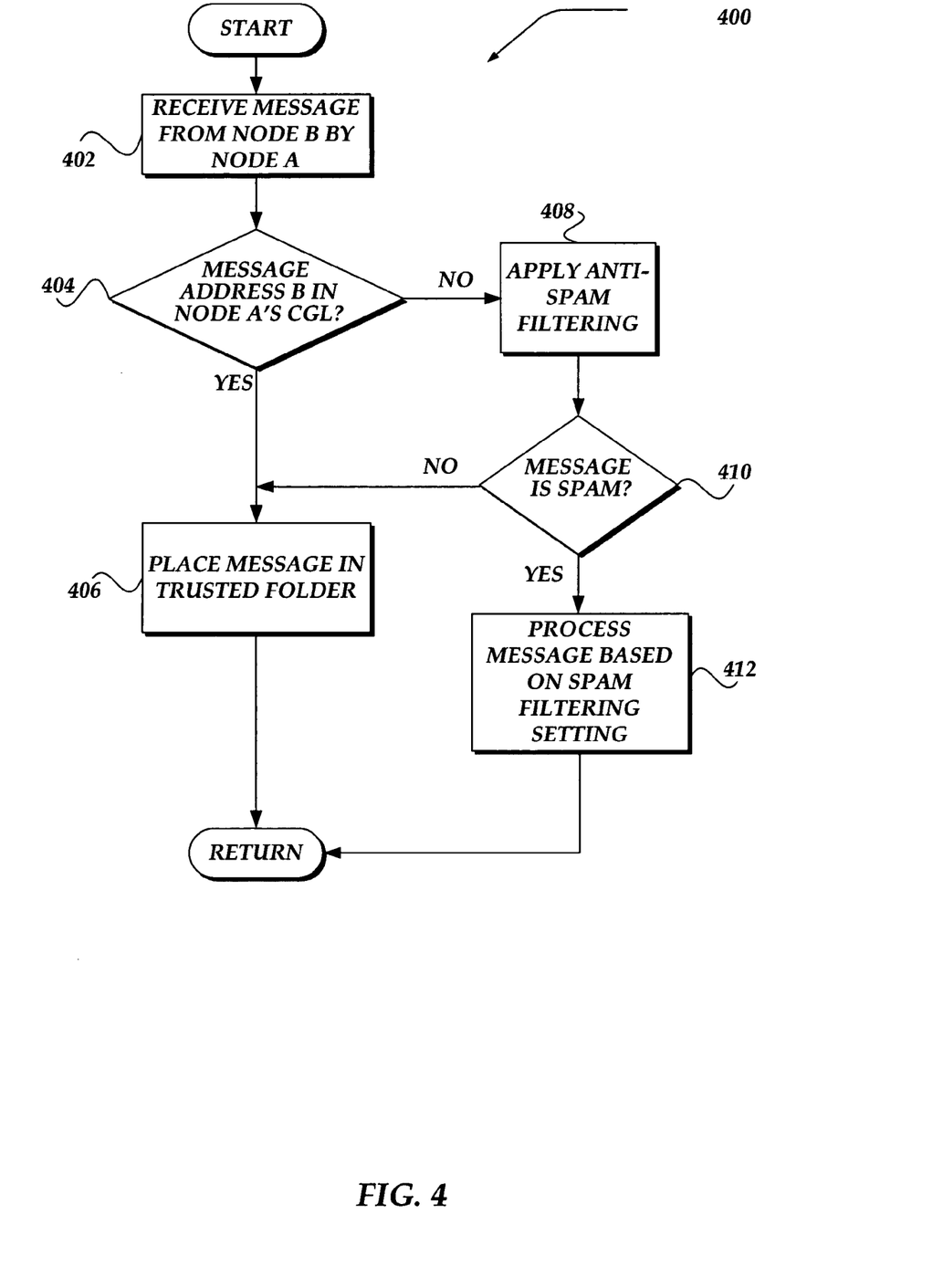
FIG. 4 shows a flow chart of a general overview of one embodiment for a process for community based green list filtering and anti-spam filtering in a messaging system.
Figure 5:
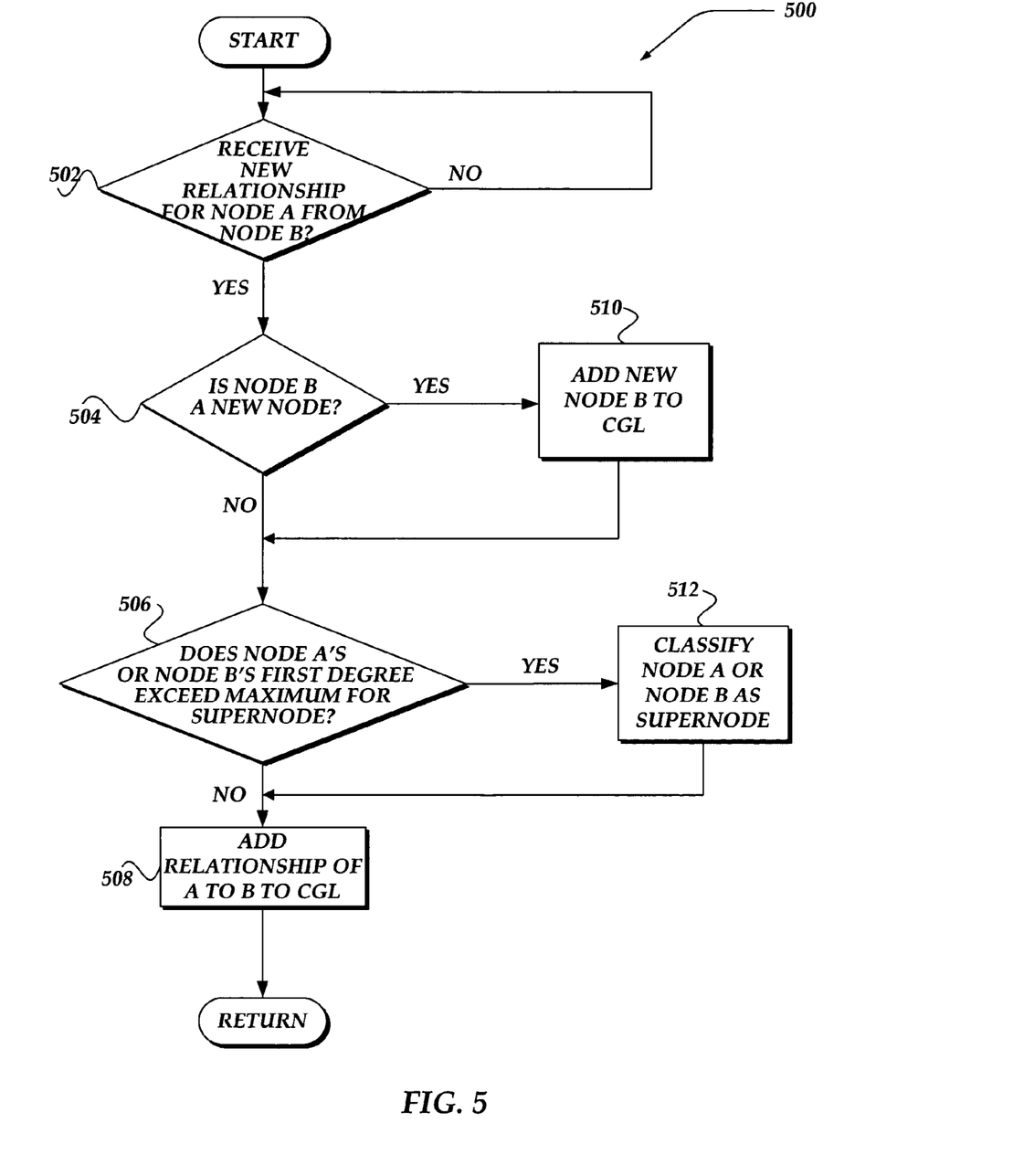
FIG. 5 illustrates a flow chart for one embodiment of a process for populating the community based green list filtering database, in accordance with the invention.

Some aspects of the embodiments discussed above are presented in the flow charts shown in FIGS. 4–6. These flow charts are provided for exemplary purposes and to further clarify aspects of the invention.

Each block of the flowchart illustrations discussed below, and combinations of blocks in the flowchart illustrations below, can be implemented by computer program instructions. These program instructions may be provided to a processor to produce a machine, such that the instructions, which execute on the processor, create means for implementing the actions specified in the flowchart block or blocks. The computer program instructions may be executed by a processor to cause a series of operational steps to be performed by the processor to produce a computer-implemented process such that the instructions, which execute on the processor, provide steps for implementing the actions specified in the flowchart block or blocks.

Accordingly, blocks of the flowchart illustrations support combinations of means for performing the specified actions, combinations of steps for performing the specified actions and program instruction means for performing the specified actions. It will also be understood that each block of the flowchart illustrations, and combinations of blocks in the flowchart illustrations, can be implemented by special purpose hardware-based systems, which perform the specified actions or steps, or combinations of special purpose hardware and computer instructions.

FIG. 4 illustrates an overview 400 of a flowchart for processing an origination address for a received message with CGL filtering. Moving from the start block, the process steps to block 402 where a message is received. For ease of illustration, process 400 describes the received message to be received from node B by node A. Process 400 proceeds to decision block 404.

At decision block 404, a determination is made as to whether the message's origination address is part of the CGL associated with node A. If true, the process advances to block 406, where the received message is placed in at least one trusted folder associated with node A. Next, the process returns to a calling process to process other actions.

Alternatively, if the determination at decision block 404 had been false (message's origination address is not in node A's CGL), then the process moves to block 408. At block 408, an anti-spam filtering mechanism is applied to the received message. The anti-spam filter mechanism could include evaluating a pre-determined black list of message addresses that are known to send spam, evaluating a white list of message addresses that are known to not send spam, content filtering to identify messages related to unsavory topics such as pornography, and the like. However, the present invention is not so limited, and virtually any anti-spam filtering mechanism may be employed to evaluate the message and/or the message address B, and the like.

From block 408, the process flows to decision block 410, where a determination is made whether the received message is determined to be a spam message. If the message is determined to be a spam message, the process flows to block 412; otherwise, the process branches to block 406 described above.

At block 412, the message is placed in a folder based on the results of the anti-spam filtering. For example, messages identified as spam could be automatically rejected, dropped, placed in a bulk folder, or the like. Messages left in the bulk folder could be automatically deleted after a period time. Next, the process returns to processing other actions.

FIG. 5 illustrates a flow chart of one embodiment of an overview process 500 for populating a CGL filter database. That is, process 500 describes one way of adding a new node. Although not illustrated, this may include not only adding a relationship between an existing node in the CGL filter database and a new node, but may also include a new relationship between two existing nodes, and even a new relationship between two new nodes to the CGL database.

In any event, process 500 begins, after a start block, at decision block 502, where a determination is made as to whether a new relationship is to be added to the CGL database for node A from node B. For ease of illustration, process 500 describes the new relationship to be for node A from node B. If no, the process loops until a new relationship is received (identified). However, if the determination at decision block 502 is affirmative, the process steps to decision block 504 where another determination is made as to whether node B is a new node. If node B is a new node, processing branches to block 510; otherwise, processing proceeds to decision block 506. At block 510, the new node, node B, is added to the CGL filter database. Processing then proceeds to decision block 506.

At decision block 506 a determination is made whether a first degree of separation associated with either node A, node B, or both nodes A and B exceeds a predetermined maximum for a super node. If a first degree of separation associated with any of the nodes of interest exceeds the predetermined maximum, processing branches to block 512; otherwise processing branches to block 508. The predetermined maximum may be set at virtually any value, be based on an algorithm, or the like. In one embodiment, the predetermined maximum is set at 1000. At block 512, the node(s) identified with a first degree of separation that exceeds the predetermined maximum degrees of separation is classified as a super node. The super node designation could be used by the CGL filter to not trust and/or exclude some if not all of the relationships associated with the super node. For example, for the relationship between the current node and the super node, degree of separation that are greater than two may be excluded, identified with a lower of trust, or the like. In any event, processing then continues to block 508, where the link (relationship) between nodes A and B are added to the CGL filter database. Upon completion of block 508, process 500 returns to a calling process to perform other actions.

Although the invention is described in terms of communication between a user and a network device, the invention is not so limited. For example, the communication may be between virtually any resource, including but not limited to multiple users, multiple servers, and any other device, without departing from the scope of the invention.

What is claimed as new and desired to be protected by Letters Patent of the United States is:

1. A method for filtering messages for a node on a network, comprising:
   determining an adaptive cut-off radius for a community based in part on a rate of growth for membership in the community that is separated by a first degree of separation, wherein a cut-off degree of separation for the cut-off radius is adapted to be relatively large if the rate of growth is relatively high, and wherein the cut-off degree of separation for the cut-off degree of separation for the cut-off radius is adapted to be relatively small if the rate of growth is relatively low;
   determining a degree of separation between each of a plurality of nodes that are associated with a first node, wherein the first node and at least a portion of the associated plurality of nodes are granted membership in the community based on a number of degrees of separation between the first node and a second node in the community, and wherein the granting of membership in the community is limited by at least the adaptive cut-off radius for the community;
   determining a level of trust for the first node in the community based on the number of degrees of separation between the first node and another node in the community; and if a message is received by the first node in the community from the other node in the community, employing the level of trust associated with the other node to determine if the message is to be delivered to at least one trusted folder associated with the first node.

2. The method of claim 1, wherein the message is one of email, Short Message Service (SMS), Multi-Media Message Service (MMS), and Instant Message (IM).

3. The method of claim 1, wherein determining the degree of separation between each of the plurality of nodes associated with the first node, further comprises determining each degree of separation between each node based at least in part on a listing in at least one of a contact list, a buddy list, a received message, a forwarded message, a saved message, a sent message, an Internet Service Provider (ISP), an online chat room, an online group, on-line social network, and a message classified as non-spam.

4. The method of claim 1, wherein the number of degrees of separation between the first node and the second node in the community is selectable.

5. The method of claim 1, wherein the level of trust associated with the other node is selectable.

6. The method of claim 1, wherein the trusted folder includes at least one of an inbox folder and a folder where unread messages are further processed after a period of time.

7. The method of claim 6, wherein the processing after a period of time further comprises at least one of deleting the message, a white list filter, a black list filter, and a content filter.

8. The method of claim 1, further comprising if another message is received from a source outside the community of nodes, employing at least one anti-spam filter to perform at least one of delete the other message and deliver the message to an untrusted folder.

9. The method of claim 1, wherein determining the degree of separation between each of the plurality of nodes, further comprises:
  determining if one of the nodes in the plurality of nodes is separated by one degree of separation from a number of nodes that is greater than a predetermined level; and
  identifying each node as a super node whose number of nodes that are separated by one degree of separation is greater than the predetermined level, wherein a level of trust for each node solely associated with super node is reduced.

10. The method of claim 1, wherein determining the degree of separation, further comprises determining that a first degree of separation from the first node is a membership in at least one of a contact list and a buddy list.

11. The method of claim 1, wherein the determining the degree of separation, further comprises determining that a first degree of separation from the first node includes a listing in more than one of a contact list, a buddy list, a received message, a forwarded message, a sent message, an Internet Service Provider (ISP), an online chat room, an online group, an on-line social network, and a message classified as non-spam.

12. The method of claim 1, further comprising assigning a high level of trust to each node that is separated from the first node by one degree of separation.

13. The method of claim 1, further comprising if a number of first degree of separation associations with nodes for the first node is less than a threshold, automatically providing membership in the community to each node associated with the first node.

14. The method of claim 1, further comprising revoking the level of trust associated with the other node based on actions related to unsolicited messages.

15. The method of claim 1, further comprising enabling each message alias for one node to be handled as the same node.

16. A server for filtering messages for a node on a network, comprising:
  a memory for storing instructions; and
  a processor for executing instructions to perform actions, including:
    determining an adaptive cut-off radius for a community based in part on a rate of growth for membership in the community that is separated by a first degree of separation, wherein a cut-off degree of separation for the cut-off radius is adapted to be relatively large if the rate of growth is relatively high, and wherein the cut-off degree of separation for the cut-off radius is adapted to be relatively small if the rate of growth is relatively low;
    determining a degree of separation between each of a plurality of nodes that are associated with a first node, wherein the first node and at least a portion of the associated plurality of nodes are granted membership in the community based on a number of degrees of separation between the first node and a second node in the community, and wherein the granting of membership in the community is controlled by at least the adaptive cut-off radius for the community;
    determining a level of trust for the first node in the community based on the number of degrees of separation between the first node and another node in the community; and
    if a message is received by the first node in the community from the other node in the community, employing the level of trust associated with the other node to determine if the message is to be delivered to at least one trusted folder associated with the first node.

17. A client on a network, comprising:
  a memory for storing instructions; and
  a processor for executing instructions to perform actions, including:
    determining an adaptive cut-off radius for a community based in part on a rate of growth for each node in the community that is separated by a first degree of separation, wherein a cut-off degree of separation for the cut-off radius is adapted to be relatively large if the rate of growth is relatively high, and wherein the cut-off degree of separation for the cut-off radius is adapted to be relatively small if the rate of growth is relatively low;
    receiving a determined degree of separation between each of a plurality of nodes that are associated with the client, wherein the client and at least a portion of the associated plurality of nodes are granted membership in the community based on a number of degrees of separation between the client and a first node in the community, and wherein the granting of membership in the community is controlled by at least the adaptive cut-off radius for the community;
    receiving a determined level of trust for the client in the community based on the number of degrees of separation between the client and a second node in the community; and
    if a message is received by the client from the second node in the community, employing the level of trust associated with the second node to determine if the message is to be delivered to at least one trusted folder associated with the client.

18. A computer processor readable storage media that includes executable data and program code that are executable by a computer processor for performing actions for filtering messages for a node on a network, comprising:

determining an adaptive cut-off radius for a community based in part on a rate of growth for membership in the community that is separated by a first degree of separation, wherein a cut-off degree of separation for the cut-off radius is adapted to be relatively large if the rate of growth is relatively high, and wherein the cut-off degree of separation for the cut-off degree of separation for the cut-off radius is adapted to be relatively small if the rate of growth is relatively low;

determining a degree of separation between each of a plurality of nodes that are associated with a first node, wherein the first node and at least a portion of the associated plurality of nodes are granted membership in the community based on a number of degrees of separation between the first node and a second node in the community, and wherein the granting of membership in the community is controlled by at least the adaptive cut-off radius for the community;

determining a level of trust for the first node in the community based on the number of degrees of separation between the first node and another node in the community; and if a message is received by the first node in the community from the other node in the community, employing the level of trust associated with the other node to determine if the message is to be delivered to at least one trusted folder associated with the first node.

* * * * *